United States Patent
Yamashita (10) Patent No.: US 7,990,433 B2
(45) Date of Patent: Aug. 2, 2011

(54) IMAGING APPARATUS AND IMAGING METHOD

(75) Inventor: Yuichiro Yamashita, Ebina (JP)

(73) Assignee: Canon Kabushiki Kaisha, Tokyo (JP)

(*) Notice: Subject to any disclaimer, the term of this patent is extended or adjusted under 35 U.S.C. 154(b) by 476 days.

(21) Appl. No.: 12/168,565

(22) Filed: Jul. 7, 2008

(65) Prior Publication Data
US 2009/0015690 A1    Jan. 15, 2009

(30) Foreign Application Priority Data
Jul. 9, 2007 (JP) .................................. 2007-179899

(51) Int. Cl.
*H04N 5/235* (2006.01)
(52) U.S. Cl. ............... 348/229.1; 348/220.1; 348/222.1; 382/168
(58) Field of Classification Search ............... 348/229.1; 382/168
See application file for complete search history.

(56) References Cited

U.S. PATENT DOCUMENTS

| | | | | |
|---|---|---|---|---|
| 5,194,960 A * | 3/1993 | Ota | .................. | 348/362 |
| 5,969,761 A * | 10/1999 | Takahashi et al. | ............ | 348/362 |
| 6,111,980 A * | 8/2000 | Sano et al. | .................... | 382/167 |
| 6,198,844 B1 * | 3/2001 | Nomura | ........................ | 382/168 |
| 6,480,226 B1 * | 11/2002 | Takahashi et al. | ............ | 348/296 |
| 6,825,884 B1 * | 11/2004 | Horiuchi | ........................ | 348/362 |
| 7,027,662 B2 * | 4/2006 | Baron | ............................ | 382/275 |
| 7,298,402 B2 | 11/2007 | Horiuchi | ................... | 348/229.1 |
| 7,609,320 B2 * | 10/2009 | Okamura | ..................... | 348/362 |
| 7,791,652 B2 * | 9/2010 | Mitsunaga | ..................... | 348/239 |
| 7,830,420 B2 * | 11/2010 | Hyoudou | ................... | 348/229.1 |
| 2003/0095192 A1 * | 5/2003 | Horiuchi | .................... | 348/222.1 |
| 2005/0264684 A1 * | 12/2005 | Kamon et al. | ................ | 348/362 |
| 2006/0268151 A1 * | 11/2006 | Yamashita | .................... | 348/362 |

FOREIGN PATENT DOCUMENTS
JP    2002-135648    5/2002

OTHER PUBLICATIONS
"Wide Dynamic Range Image Processing Technology," National Technical Report, vol. 43, No. 4, Aug. 1997, pp. 457-460.
English translation of "Wide Dynamic Range Image Synthesizing Processing Techniques," National Technical Report, vol. 43, No. 4, Aug. 1997, pp. 457-460.

* cited by examiner

*Primary Examiner* — Jason Chan
*Assistant Examiner* — Cynthia Calderon
(74) *Attorney, Agent, or Firm* — Fitzpatrick, Cella, Harper & Scinto (57) ABSTRACT

An apparatus and method that determines an appropriate light exposure condition to generate an appropriate synthesized image signal for an imaging scene for which an appropriate light exposure condition cannot be obtained by conventional techniques. The apparatus includes a determining unit for determining a plurality of light exposure conditions based on a histogram of the luminance distribution of an imaging scene, an imaging unit for imaging, plural times, the scene under the plurality of determined light exposure conditions, and generating first and second raw image signals, and an image synthesizing unit for synthesizing the first and second raw image signals using, as a boundary, a reference value in the first raw image signal to generate a synthesized image signal. The determining unit determines at least one light exposure condition of the light exposure conditions so that the reference value in the first raw image signal corresponds to the luminance value at the bottom of a ravine of the histogram of the luminance distribution of the scene.

10 Claims, 4 Drawing Sheets

PRIOR ART

IMAGING APPARATUS AND IMAGING METHOD

BACKGROUND OF THE INVENTION

1. Field of the Invention

The present invention relates to an imaging apparatus and an imaging method.

2. Description of the Related Art

When images are taken, there can be cases where the dynamic range of the luminance of the imaging scene is beyond the input dynamic range of the imaging apparatus, such as a digital still camera and a digital video camera. In such a case, portions of the imaging scene having a luminance out of the input dynamic range are photographed to be blacked out (black fall) or whited out (white raise) in the taken picture, losing their information about shapes and colors.

In order to solve this problem, various imaging apparatus having a wide input dynamic range are proposed, one of which is an imaging apparatus which performs photographing a plurality of times under different light exposure conditions, that is, so-called multiple exposures, to obtain image signals of a plurality of images of different exposure amounts, and thereafter synthesizes the image signals to generate a "synthesized image signal" having a wide input dynamic range.

Such an apparatus needs to calculate the light exposure condition of each photographing operation so as to minimize the extent of the occurrence of the phenomena of black fall and white raise in the synthesized image signal when the phenomena of black fall and white raise occur in the image signals before synthesizing. In this case, an effective method is to calculate a plurality of light exposure conditions for photographing a plurality of times, that is, a light exposure condition group, using a histogram of the luminance distribution of an imaging scene obtained in advance by any technique.

Figure 6:
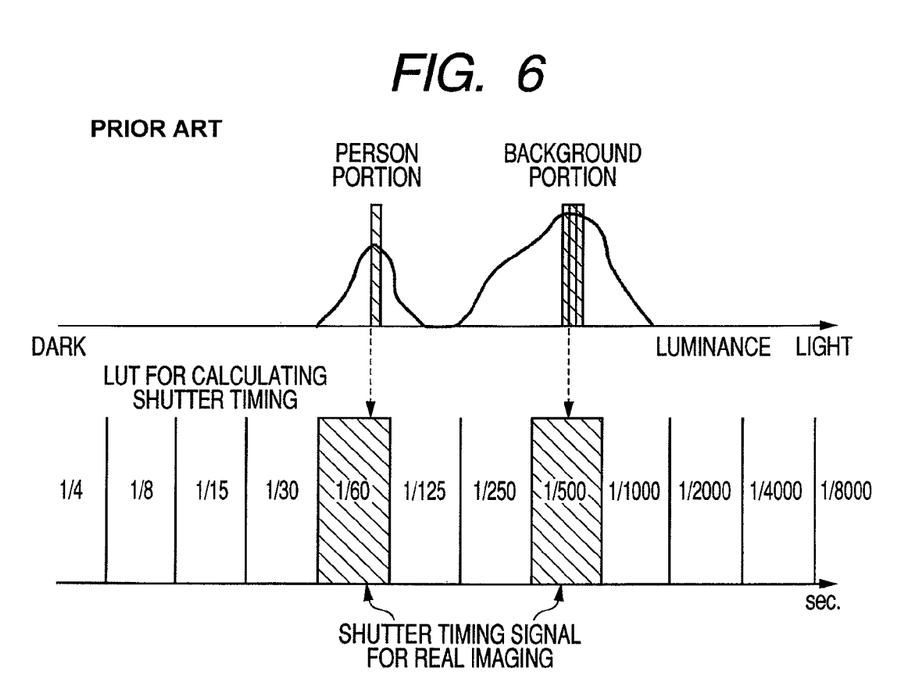
FIG. 6 is a view describing the technique for determining light exposure conditions using a histogram, described in Patent Document 1.

FIG. 6 is a view describing the technique for calculating a light exposure condition group using a histogram, described in Japanese Patent Application Laid-Open No. 2002-135648 (Patent Document 1). A light exposure condition group is calculated that is optimal for the peak portions of frequency in a histogram calculated from the luminance distribution of an imaging scene.

Figure 7:
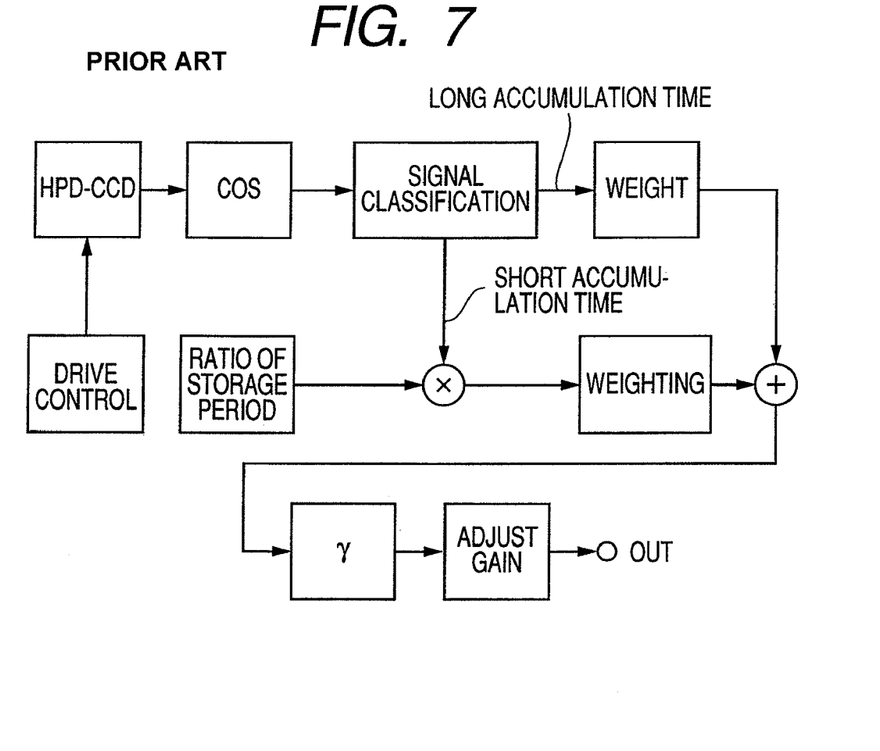
FIG. 7 is a block diagram describing an example of the configuration of the wide dynamic range imaging apparatus described in Non-Patent Document 1.

FIG. 7 is the conventional technique for synthesizing raw image signals of two images of different exposure time periods, described in "Wide dynamic range image synthesis processing technique", National Technical Report Vol. 43, No. 4, August 1997, pp 455-460 (Non-Patent Document 1). A raw image signal (hereinafter referred to simply as an image signal) of a raw image of "a long period of accumulation time" (hereinafter referred to as a light exposure of a long time period) and an image signal of "a short period of accumulation time" (hereinafter referred to as a light exposure of a short time period), obtained from the CCD, are multiplied by a gain comprising the ratio of time periods of accumulation, and thereafter are added together to produce a weighted sum. Here, as for the technique of weighting, the weighting is determined so as to provide a linear change from an image signal of a light exposure of a long time period to an image signal of a light exposure of a short time period in the range from 80% to 100% of the output dynamic range of the image signal of the image of a light exposure of a long time period.

In other words, with respect to the operation of synthesizing using a reference value as the boundary, in the above example, the value of "80% of the output dynamic range of the image signal of the image of a light exposure of a long time period" is used as the reference value, and synthesizing is performed using that value as the boundary. In addition, with respect to the actual operation of synthesizing, the operation of "multiplying long and short exposure time signals by a gain comprising the ratio of time periods of accumulation and thereafter adding together these products to product a weighted sum" is performed.

In the technique of Patent Document 1, although an optimum light exposure condition group can be obtained for an imaging scene of a condition as shown in FIG. 6, there are scenes for which an optimum light exposure condition group cannot be calculated. The problem is described below.

Figure 8:
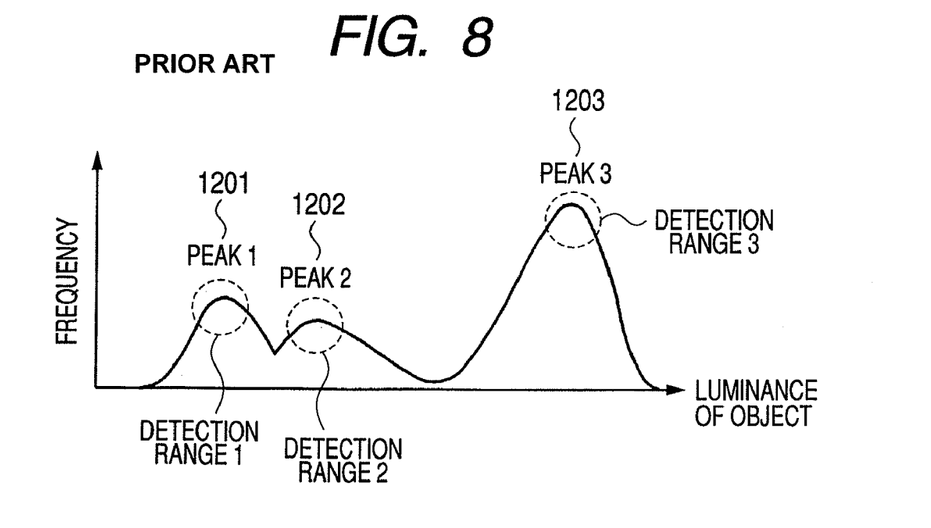
FIG. 8 is a view illustrating the luminance of an object having three different degrees of brightness in the screen, converted to a histogram.

FIG. 8 is the luminance distribution of an imaging scene including three objects in the scene having different brightnesses, converted to a histogram.

The technique shown in Patent Document 1 detects "peak portions". Therefore, in this case, three ranges represented by 1201, 1202, 1203 are detected and an attempt is made to calculate light exposures which are optimum for these ranges. Only two exposures are permitted for the three ranges, and it is difficult to obtain an optimum light exposure condition group.

The object of the present invention is to determine an appropriate light exposure condition to thereby to generate an appropriate synthesized image signal for an imaging scene for which an appropriate light exposure condition cannot be obtained by conventional techniques, as illustrated above.

The imaging apparatus of the present invention includes: a light exposure condition determining unit for determining a plurality of light exposure conditions based on a histogram of the luminance distribution of an imaging scene; an imaging unit for imaging, at plural times, the imaging scene under the plurality of determined light exposure conditions, and generating a first raw image signal and a second raw image signal; and an image synthesizing unit for synthesizing the first raw image signal and the second raw image signal using, as a boundary, a reference value in the first raw image signal to generate a synthesized image signal, wherein the light exposure condition determining unit determines at least one of the plurality of light exposure conditions so that the reference value in the first raw image signal corresponds to the luminance value at the bottom of a ravine of the histogram of the luminance distribution of the imaging scene.

The imaging method of the present invention includes: a light exposure condition determining step for determining a plurality of light exposure conditions based on a histogram of the luminance distribution of an imaging scene; an imaging step for imaging, at plural times, the imaging scene under the plurality of determined light exposure conditions, and generating a first raw image signal and a second raw image signal; and an image synthesizing step for synthesizing the first raw image signal and the second raw image signal using, as a boundary, a reference value in the first raw image signal to generate a synthesized image signal, wherein the light exposure condition determining step determines at least one of the plurality of light exposure conditions so that the reference value in the first raw image signal corresponds to the luminance value at the bottom of a ravine of the histogram of the luminance distribution of the imaging scene.

Other features and advantages of the present invention will be apparent from the following description taken in conjunction with the accompanying drawings, in which like reference characters designate the same or similar parts throughout the figures thereof.

The accompanying drawings, which are incorporated in and constitute a part of the specification, illustrate embodiments of the invention and, together with the description, serve to explain the principles of the invention.

DESCRIPTION OF THE EMBODIMENTS

First Embodiment

Figure 1:
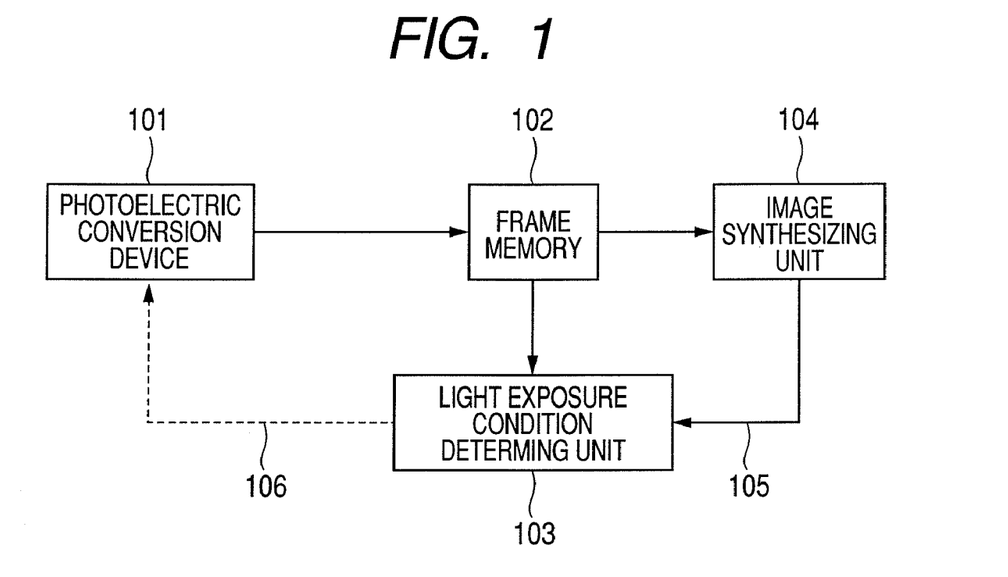
FIG. 1 is a block diagram describing an example of the configuration of a wide dynamic range imaging apparatus according to a first embodiment of the present invention.

FIG. 1 is a block diagram illustrating an example of the configuration of a wide dynamic range imaging apparatus according to a first embodiment of the present invention. A photoelectric conversion device 101 converts optical information of an imaging scene to an electrical signal; specifically a CCD and a CMOS image sensor are cited for example. By photographing an imaging scene under a certain light exposure condition, the photoelectric conversion device 101 performs the operation of converting the range of the luminance of the imaging scene accommodated in its input dynamic range to an image signal. The image signal of an image output by the photoelectric conversion device 101 is temporarily accumulated in a frame memory 102 and thereafter is output to a light exposure condition determining unit 103 and an image synthesizing unit 104. The image synthesizing unit 104 generates a synthesized image signal from the image signals of a plurality of images of different light exposure conditions.

In the following, a description is provided with respect to the operation in which image signals suffering the white raise phenomenon of an image taken with a light exposure of a long time period among the image signals of a plurality of images are processed so as to synthesize an image that does not suffer the white raise phenomenon by using the image signals of the same coordinates in the image taken with a light exposure of a short time period, when the synthesis is performed, as an example.

In addition, the reference value here corresponds to the image signal value to be the threshold value for a determination of the occurrence of the white raise phenomenon in the image taken with a light exposure of a long time period. That value is fed back to the light exposure condition determining unit 103 from the image synthesizing unit 104 through a reference value signal line 105.

A method may also be used in which image signals suffering the black fall phenomenon of an image taken with a light exposure of a short time period are processed so as to synthesize an image that does not suffer the black fall phenomenon by using the image signals of the same coordinates of the image taken with a light exposure of a long time period. In that case, the text may be read by appropriately exchanging "long time period/short time period" and "white raise/black fall" in the above description.

As for the definition of the term "white raise" here, it does not necessarily mean a state in which a signal clips the maximum value of the dynamic range. In a case where linearity of the input-output characteristic of the imaging apparatus is not secured in the side of the maximum output value, for example, the term "white raise" may refer to a state in which a signal is within the upper 10% range of the dynamic range, the data thereof being not used.

In the same way, as for the definition of the term "black fall" here, it does not necessarily mean a state in which a signal clips the minimum value of the dynamic range. The term "black fall" may refer to a state in which a signal is within the lower 10% range of the dynamic range of the imaging apparatus, for example.

In the present embodiment, no limitation is made with respect to the technique for determining the reference value and the manner of synthesizing operation. This is because the present embodiment relates to a technique for determining a plurality of light exposure conditions on the premise that the above is given by known techniques.

Figure 2:
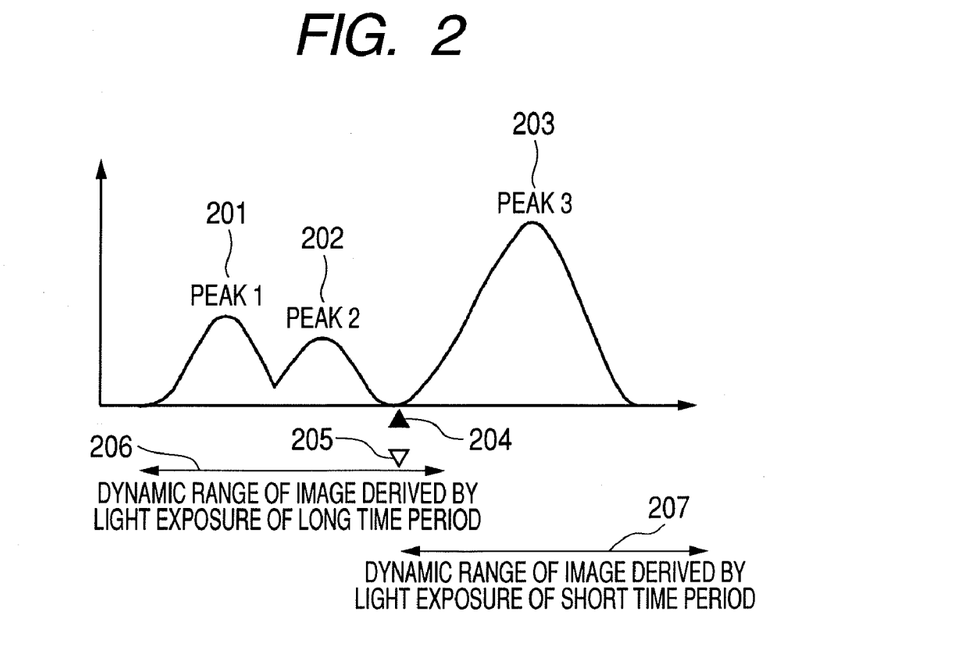
FIG. 2 is a view illustrating an example of a histogram of the luminance of an object obtained.

FIG. 2 is an example of a histogram of the luminance distribution of an imaging scene. The abscissa represents the luminance of objects, and the ordinate represents the frequency. There exist three large peaks 201 to 203. With respect to an imaging scene having such a histogram, image signals corresponding to two images are obtained to produce a wide dynamic range image, on which occasion light exposure conditions optimum for each photographing are provided by a technique which will be described below.

First, as a preliminary step for determining the light exposure conditions, a light exposure of a long time period and a light exposure of a short time period are performed under a predetermined condition to obtain an image of a dynamic range wider than that of an image which would be taken under a single light exposure condition: for example, an image having the histogram depicted by FIG. 2. Next, the image synthesizing unit 104 outputs a reference value 205 to the light exposure condition determining unit 103. The reference value 205 is, for example, an image signal value (luminance value) in the range from 80% to 100% of an output dynamic range 206 of the image signal of the image of the light exposure of a long time period; and is desirably the image signal value (luminance value) of 80%. Next, the light exposure condition determining unit 103 determines the luminance corresponding to a luminance value 204 corresponding to the bottom of a ravine of the histogram from the above-described histogram. Next, the light exposure condition determining unit 103 calculates such a light exposure condition that the above luminance just corresponds to the reference value in the image of a light exposure of a long time period indicated by a white triangle 205 in the figure. As one of specific methods for calculation, the exposure amount may be calculated so as to satisfy the following equation.

Exposure amount×luminance value (204)×[luminance-illuminance transform coefficient]=reference value (205)

The "luminance-illuminance transform coefficient" here is a coefficient for transforming the luminance of objects into the surface illuminance immediately before the photoelectric conversion device, determined by the lens and the like. The light exposure condition for the light exposure of a long time period in photographing a scene two times is thus calculated.

Next, the light exposure condition determining unit 103 calculates the light exposure condition for the light exposure of a short time period. An example of techniques for calculating the light exposure condition for the light exposure of a short time period is a method in which it is uniquely determined by multiplying the light exposure condition for the light exposure of a long time period by a certain coefficient. When the coefficient is 0.1 and the exposure amount is controlled only by time, the light exposure condition for the light exposure of a short time period is the exposure time period on the part for the light exposure of a long time period determined this time multiplied by 0.1. The calculated light exposure condition group is fed back to the photoelectric conversion device 101 from the light exposure condition determining unit 103 through a light exposure condition signal line 106.

In addition, as another technique for calculating the light exposure condition for the light exposure of a short time period, there is also a method as follows. First, since the range of the luminance distribution of an imaging scene which can be photographed with a light exposure of a long time period is already determined in foregoing processes, ranges in the histogram determined to produce the e white raise phenomenon in the case of light exposure of a long time period alone are extracted. Thereafter, such a light exposure condition as to generate these ranges optimally is separately calculated. As specific techniques, there are methods such as one in which a light exposure condition optimal for a peak of the histogram of the extracted ranges is selected, and one in which a light exposure condition optimal for the average value of luminance calculated from the histogram of the extracted ranges is selected.

The present embodiment does not particularly limit the method of selecting the exposure time period for the light exposure of a short time period. The characteristic of the present embodiment is in that the "change" of signals that occurs during the image-signal synthesizing operation occurs at a position at the bottom of a ravine of the histogram. This effects can be provided without being particularly limited by the technique for calculating the light exposure condition on the part of the light exposure of a short time period.

In addition, it is necessary to determine the histogram of the luminance distribution of the imaging scene prior to calculation of the above light exposure condition; the histogram of a prior frame may be used in the case of a moving image, for example. In the case of a still image, the histogram of the subject is determined in advance by a preceding photographing operation.

Next, the method of photographing based on the obtained suitable light exposure condition and obtaining a wide dynamic range image will be described. The photoelectric conversion device 101 performs the main photographing operation under the light exposure condition of the light exposure of a long time period obtained by the above-described method, and outputs the image signal of the light exposure of a long time period through the frame memory 102 to the image synthesizing unit 104. The dynamic range 206 is the dynamic range of the image derived by the light exposure of a long time period. Next, the photoelectric conversion device 101 performs the main photographing operation under the light exposure condition of the light exposure of a short time period obtained by the above-described method, and outputs the image signal of the light exposure of a short time period through the frame memory 102 to the image synthesizing unit 104. The dynamic range 207 is the dynamic range of the image derived by the light exposure of a short time period.

The image synthesizing unit 104 multiplies the image signal of the image of the light exposure of a long time period and the image signal of the image of the light exposure of a short time period by a gain comprising the ratio of time periods of electric charge accumulation (exposure time periods) and thereafter adds them to produce a weighted sum, thereby generating a synthesized image. The weighting is performed so as to provide a linear change from the signal of the image of the light exposure of a long time period to the signal of the image of the light exposure of a short time period at the reference value 205. In other words, the image synthesizing unit 104 synthesizes the image signal of the image of the light exposure of a long time period and the image signal of the image of the light exposure of a short time period using the reference value 205 as a boundary to generate a synthesized image signal.

Of course the above example is an example; for example, the signal value corresponding to 100% of the output dynamic range of the image signal of the image of the light exposure of a long time period may be used as the reference value 205. In addition, the actual operation of synthesis may be a technique such as "replacing the image signal of the light exposure of a long time period by the image signal of the light exposure of a short time period", instead of the technique of "producing a weighted sum".

The effect of the present embodiment is as follows. The value of an image signal at which images are changed at the time of synthesis is fed back to the light exposure condition determining unit 103 from the image synthesizing unit 104 as a reference value, and the value of the image signal corresponding to the luminance of change corresponds to the bottom of a ravine of the histogram of the luminance distribution of the imaging scene. By using this technique, unlike the conventional example described in FIG. 6, optimum exposures can be obtained even for objects having three peaks.

In addition, there are cases where an apparent discontinuity is generated by a difference in noise amounts due to the difference in the light exposure conditions between adjacent pixels in a position in the synthesized image where the change of the image of the light exposure of a long time period and the image of the light exposure of a short time period occurs. According to the present embodiment, however, the frequency of occurrence of pixels generating such discontinuity is minimized in the scene so that the quality of the image is improved.

Figure 3:
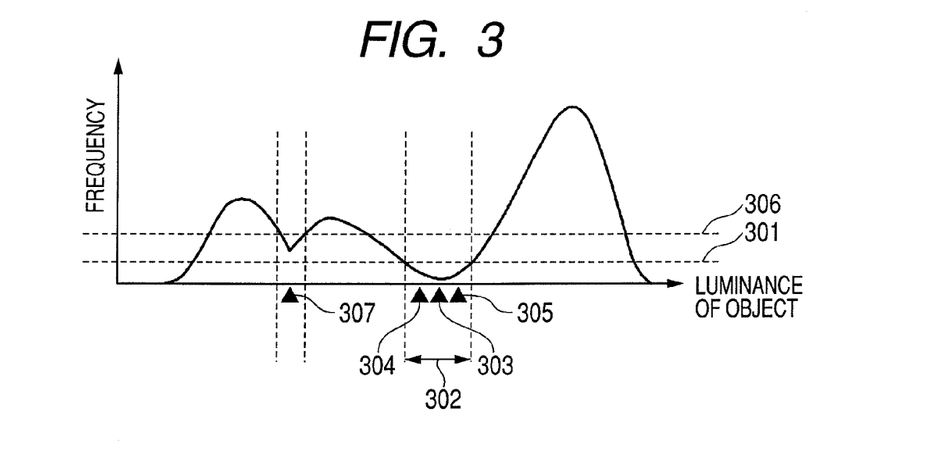
FIG. 3 is a view illustrating another example of a histogram of the luminance of an object.

Next, the specific method of selecting a luminance value belonging to the bottom of a ravine of a histogram will be described using a histogram of FIG. 3 as an example. Given a histogram such as of FIG. 3, there is, for example, a technique in which the whole of a range 302 of values equal to or less than a certain threshold value 301 is taken as "the bottom of a ravine", and a luminance value 303 at the center thereof is selected as the luminance value belonging to the bottom of a ravine.

Alternatively, in order to select a degree of luminance from the bottom of a ravine, instead of selecting the center, several degrees of luminance in the bottom of a ravine such as 303, 304, and 305 are selected, and light exposure condition groups are temporarily selected respectively for these plurality of values by the above-described technique. Then, among these temporarily selected light exposure condition groups, a light exposure condition group is estimated that will generate a synthesized image having a few pixels suffering the phenomena of white raise and black fall, using known histograms; that light exposure condition group and the luminance corresponding to that light exposure condition group are selected. In this way, an optimum light exposure condition group is obtained.

In addition, when a threshold value such as 306 is provided, another bottom of a ravine 307 can emerge, giving rise to two possible light exposure condition groups. In such a case, with respect to each combination, the number of white raise pixels and black fall pixels in each of synthesized images for which exposures are made using these combinations is estimated using known histograms prior to the main photographing operation. Then, a combination of light exposure conditions which will minimize the occurrence of white raise pixels and black fall pixels in the synthesized image may be selected.

Alternatively, for a definition of the bottom of a ravine, instead of using a threshold value, the bottom of a ravine may be defined as a range where the shape of the histogram is downwardly convex, that is, a range where the second derivative of the histogram as a function is negative.

In any case, the method of selecting the luminance belonging to the bottom of a ravine and the threshold value for the definition of the bottom of a ravine are design parameters, there being a trade-off between them and calculation time and the like. The effect of the present embodiment can be obtained equally no matter which technique is used.

Next, it will be described below that additional effects can be obtained by performing weighting at the time of counting the frequency in the calculation of a histogram used for calculating light exposure conditions.

For example in the scene, by counting the frequency of the luminance of pixels located near the center in the imaging scene as two or three instead of one in making a histogram, a histogram is formed in which the luminance information of pixels located near the center is greater. In addition, a plurality of light exposure conditions suitable for images located near the center of the screen can be calculated.

In addition, by separately performing shape recognition to recognize shapes such as a "face" and the "background" and respectively weighting them, a plurality of light exposure conditions suitable for the luminance information corresponding to these shapes can be calculated.

In addition, by separately recognizing flesh color and heavily weighting it, a plurality of light exposure conditions suitable for flesh color can be calculated.

In addition, by separately recognizing movements and weighting moving objects, a plurality of light exposure conditions suitable for moving objects can be calculated.

The present embodiment does not particularly limit the method itself for recognizing shapes, colors and movements. This is because the effect of the present embodiment can be obtained equally regardless of the recognition method.

Second Embodiment

Figure 4A:
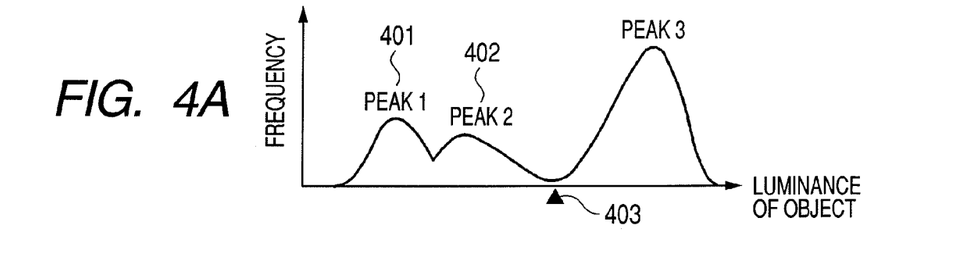
FIGS. 4A and 4B are views describing the imaging method of an imaging apparatus according to a second embodiment of the present invention.
Figure 4B:
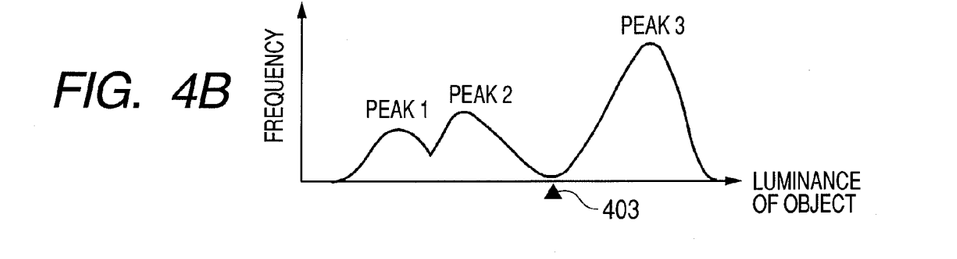

FIGS. 4A and 4B are views illustrating the imaging method of an imaging apparatus according to a second embodiment of the present invention. The present embodiment assumes that objects change their luminance with time, such as in the taking of moving pictures; for example, a scene is assumed in which the magnitude relation between the frequencies of peaks 401 and 402 changes frequently as illustrated in FIGS. 4A and 4B, due to a blinking light source or constantly varying sunlight appearing through trees.

By using the technique of the first embodiment, the light exposure condition group does not significantly change even when the peak positions of the histogram of the luminance distribution of an imaging scene replace each other as illustrated in FIGS. 4A and 4B, since the light exposure condition group is calculated using a value 403 belonging to the bottom of a ravine as the reference in the present embodiment.

An effect unique to the present embodiment will be described. In the conventional example, the light exposure condition is determined based on a position where much image data exists, that is, peaks and mountains in the histogram so that the light exposure condition frequently changes when an imaging scene as shown in FIGS. 4A and 4B are taken as a moving picture. Frequent change of the light exposure condition are shown as flicker in replaying moving pictures, which significantly degrades the quality of images.

In the present embodiment, since the light exposure condition is calculated always using the value 403 as the reference, the same optimum light exposure condition is obtained even if peaks of the histogram fluctuate to some extent, providing a stable synthesized image free of flicker.

Third Embodiment

Figure 5:
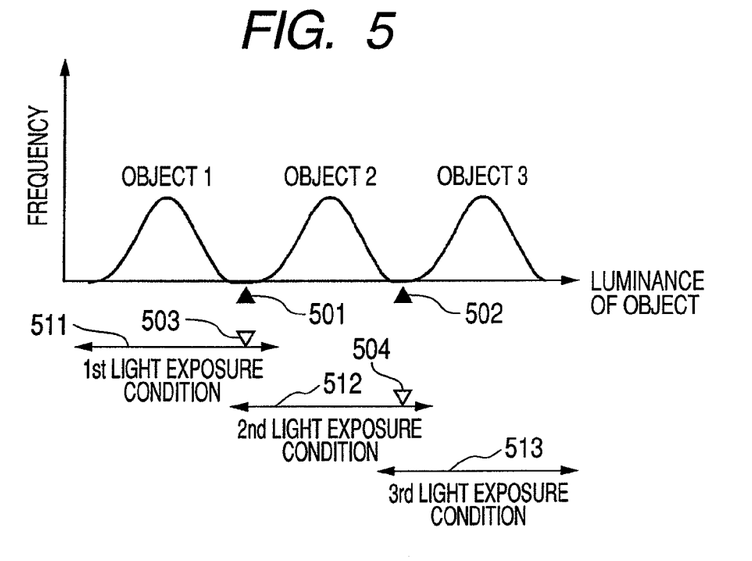
FIG. 5 is a view describing the imaging method of an imaging apparatus according to a third embodiment of the present invention.

FIG. 5 is a view describing the imaging method of an imaging apparatus according to a third embodiment of the present invention. Here, a histogram having three peaks at spaced positions is assumed. The present embodiment has an imaging scene of a dynamic range of luminance much wider than those of the first and second embodiments; by a technique performing synthesis based on two images, the scene would have many pixels in the synthesized image suffering the white raise or black fall phenomenon.

The operation of the present embodiment in such a case will be described below. The configuration of the imaging apparatus is exactly the same as that of FIG. 1. First, in the same way as the first and second embodiments, a histogram of luminance of objects as shown in FIG. 5 is obtained based on some preceding photographing operation. The histogram obtained as a result of the preceding photographing operation is analyzed by the image synthesizing unit 104 to determine that a synthesized image free of white raise pixels and black fall pixels cannot be created by photographing the scene two times. Then, the image synthesizing unit 104 indicates to the light exposure condition determining unit 103 that photographing operation is to be performed three times now. Alternatively, the determination that photographing is to be performed three times may be made not by the image synthesizing unit 104 but by the light exposure condition determining unit 103.

In the present embodiment, the positions of change of the image data, that is, the reference values in each photographing operation are indicated by white triangles 503, 504. Since the reference values in both of the case of photographing under a first light exposure condition 511 and the case of photographing under a second light exposure condition 512 are the same image signal value, they are positioned at the same location in the dynamic ranges of each photographing operation. However, since the photographing operation is assumed to be performed two times respectively under different light exposure conditions, the triangles 503, 504 correspond to luminance values respectively having different values.

Three light exposure conditions are calculated such that the luminance values corresponding to the reference values are positioned at values 501, 502 of the bottoms of ravines of the histogram. The method for determining the values of the bottoms of ravines is the same as that described in the first embodiment.

In addition, the technique for calculating the light exposure condition of the image of the light exposure of a short time period exposed in the shortest time period indicated by a third light exposure condition 513 in the figure is also the same as that described in the first embodiment. The photoelectric conversion device 101 generates the three imaging signals of the first light exposure condition 511, the second light exposure condition 512 and the third light exposure condition 513. The image synthesizing unit 104 synthesizes the three image signals.

An effect unique to the present embodiment will be described. In the present embodiment, even in a case where the range of luminance of the object is so wide that it cannot be fully determined by photographing a scene two times, the effects of the first and second embodiments can be obtained equally by dynamically feeding back an optimum number of exposures from the image synthesizing unit 104.

As described above, according to the first to third embodiments, the light exposure condition determining unit 103 determines a plurality of light exposure conditions based on a histogram of the luminance distribution of the imaging scene. The photoelectric conversion device 101 is an imaging unit which photographs the imaging scene a plurality of times under the plurality of light exposure conditions determined to generate a first raw image signal and a second raw image signal. The image synthesizing unit 104 synthesizes the first raw image signal and the second raw image signal using, as a boundary, the reference value 205 in the first raw image signal to generate a synthesized image signal. The light exposure condition determining unit 103 determines at least one light exposure condition of the plurality of light exposure conditions such that the reference value 205 in the first raw image signal corresponds to the luminance value 204 at the bottom of a ravine of the histogram of the luminance distribution of the imaging scene.

The histogram of the luminance distribution of the imaging scene is weighted at the time of counting the frequency based on an imaging parameter. The imaging parameter is a position in the imaging scene. Or, the imaging parameter is a shape of an object existing in the imaging scene. Or, the imaging parameter is a color of an object existing in the imaging scene. Or, the imaging parameter is a movement of an object existing in the imaging scene.

The light exposure condition determining unit 103 determines a plurality of light exposure condition candidates such that the reference values 205 correspond respectively to a plurality of luminance values 303 to 305 positioned at the bottom of a ravine of the histogram, and determines a light exposure condition from among the plurality of light exposure condition candidates based on an evaluation function.

The evaluation function is a function derived by counting and estimating from the histogram the number of black fall pixels or white raise pixels in the synthesized image signals generated using the plurality of light exposure condition candidates respectively.

In the third embodiment, the light exposure condition determining unit 103 changes the number of light exposure conditions determined based on the number of black fall pixels or white raise pixels in the synthesized image signal that are estimated based on the histogram, and changes the number of times that photographing by the imaging unit 101 is performed.

According to the first to third embodiments, an optimum light exposure condition group can be obtained in an imaging scene having three or more peaks, in which calculation of an appropriate light exposure condition has conventionally been difficult.

Especially, there are cases where an apparent discontinuity is generated by a difference in noise amounts due to a difference in the light exposure conditions between adjacent pixels in a position at which there is a change of images in the synthesized image. In that case, the frequency of occurrence of pixels generating such a discontinuity can be minimized in the scene according to the present embodiment so that the quality of the image is improved.

In addition, since the light exposure condition is calculated always using the value at the bottom of a ravine as the reference, the same optimum light exposure condition can be obtained even if peaks of the histogram fluctuate to some extent.

In addition, an optimum number of exposures is dynamically fed back from the image synthesizing unit 104. In this way, even in a case where the dynamic range of luminance of the imaging scene is so wide that it cannot be fully determined by photographing a scene two times, the number of signals suffering the black fall or white raise phenomenon in the synthesized image signal can be reduced while obtaining all of the above effects.

It should be noted that any of the above embodiments only shows an example for embodying the present invention to implement the same, and the technical scope of the present invention must not be interpreted as being limited by them. That is, the present invention can be implemented in various forms without departing from its technical spirit and its main features.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-179899, filed Jul. 9, 2007, which is hereby incorporated by reference herein in its entirety.

What is claimed is:

1. An imaging apparatus comprising:
    a light exposure condition determining unit that determines a plurality of exposure conditions based on a histogram of a luminance distribution of an imaging scene;
    an imaging unit that images, plural times, the imaging scene under the plurality of exposure conditions determined by the light exposure condition determining unit, and generates first and second raw image signals before synthesizing the first and second raw image signals; and
    an image synthesizing unit that synthesizes the first and second raw image signals using, as a boundary, a reference value contained in the first raw image signal to generate a synthesized image signal, wherein
    the light exposure condition determining unit determines at least one of the plurality of exposure conditions so that the reference value contained in the first raw image signal corresponds to a luminance value at a bottom of a ravine of the histogram of the luminance distribution of the imaging scene.

2. The imaging apparatus according to claim 1, wherein the histogram of the luminance distribution of the imaging scene is formed by an imaging parameter weighting at a time of counting the frequency of occurrence of luminances in the histogram.

3. The imaging apparatus according to claim 2, wherein the imaging parameter is a position in the imaging scene.

4. The imaging apparatus according to claim 2, wherein the imaging parameter is the shape of an object in the imaging scene.

5. The imaging apparatus according to claim 2, wherein the imaging parameter is a color of an object in the imaging scene.

6. The imaging apparatus according to claim 2, wherein the imaging parameter is a movement of an object in the imaging scene.

7. The imaging apparatus according to claim 1, wherein the light exposure condition determining unit determines a plurality of exposure condition candidates so that the reference values thereof correspond respectively to plural luminance values at bottoms of ravines of the histogram, and elects one of the corresponding reference values as the light exposure condition from the plurality of candidates based on an evaluation function.

8. The imaging apparatus according to claim 7, wherein the evaluation function is derived by calculating, via estimation, from the histogram, the number of black fall pixels or white raise pixels in the synthesized image signal generated using the plurality of light exposure condition candidates respectively.

9. The imaging apparatus according to claim 1, wherein the light exposure condition determining unit changes, based on the number of black fall pixels or white raise pixels in the synthesized image signal estimated based on the histogram, the number of the light exposure conditions to be determined, and the imaging time by the imaging unit.

10. An imaging method comprising:
a light exposure condition determining step for determining a plurality of exposure conditions based on a histogram of a luminance distribution of an imaging scene;
an imaging step for imaging, at plural times, the imaging scene under the plurality of exposure conditions determined by the light exposure condition determining step, and generating first and second raw image signals before synthesizing the first and second raw image signals; and
an image synthesizing step for synthesizing the first and second raw image signals using, as a boundary, a reference value contained in the first raw image signal to generate a synthesized image signal, wherein
the light exposure condition determining step determines at least one of the plurality of exposure conditions so that the reference value contained in the first raw image signal corresponds to a luminance value at a bottom of a ravine of the histogram of the luminance distribution of the imaging scene.

* * * * *